United States Patent Office 2,865,480
Patented Dec. 23, 1958

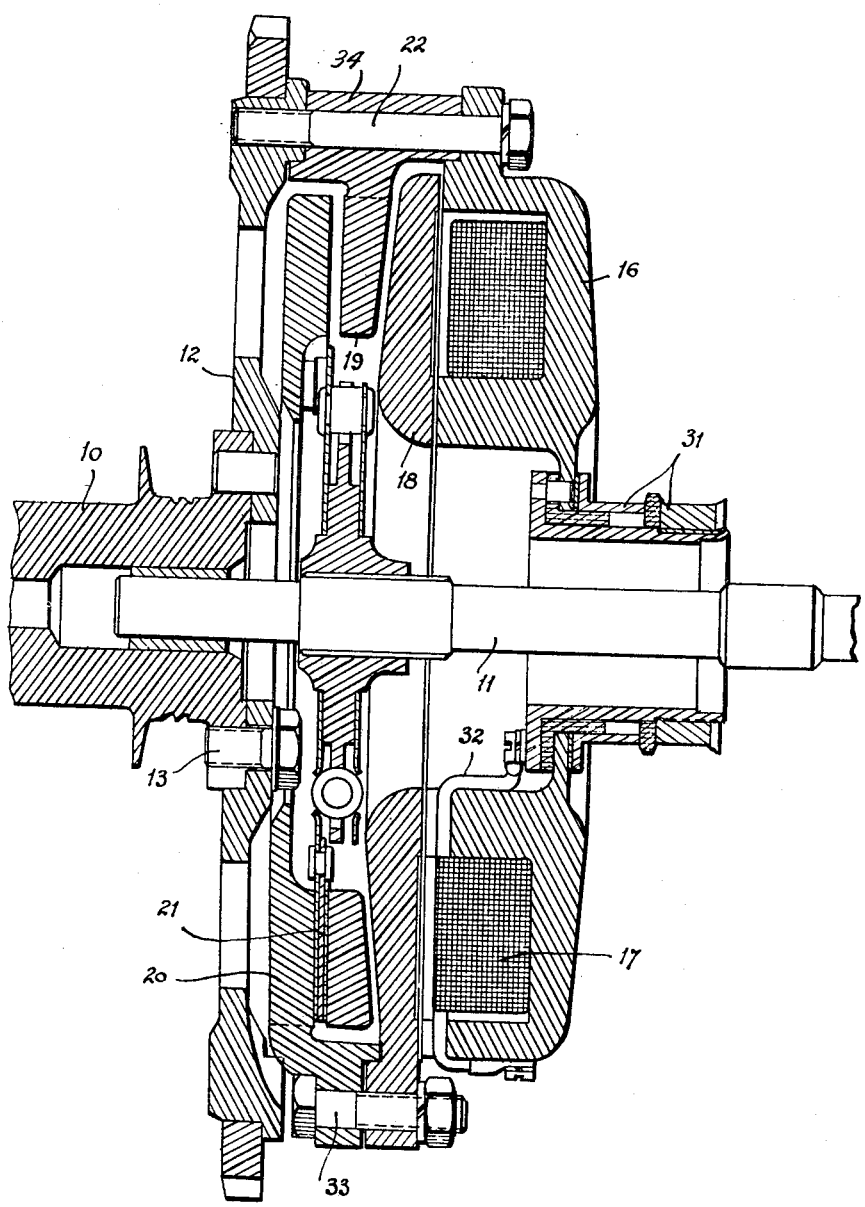

2,865,480
ELECTROMAGNETIC CLUTCHES

Jean Maurice, Ablon, and Michel Rist, Paris, France, assignors to Societe Anonyme Francaise du Ferodo, Paris, France, a corporation of France Application July 6, 1955, Serial No. 520,278

Claims priority, application France July 12, 1954

4 Claims. (Cl. 192—84)

The present invention relates to electro-magnetic clutches, especially for automobile vehicles, of the kind comprising an electro-magnet yoke rigidly coupled to the driving shaft and to a friction plate, whilst the armature of the electro-magnet is rigidly fixed for rotation but free to move laterally with respect to the said yoke and is rigidly fixed to a further friction plate, the two plates being intended to grip a friction disc rigidly fixed for rotation with a driven shaft.

In the known clutches of this type, the yoke generally forms the fly-wheel of the engine and is fixed to the crankshaft by means of a flange of small diameter. The other members of the clutch must thus be assembled with this yoke when the latter is already adjusted in position on the crankshaft, and the setting of the air-gap in the engaged position of the clutch must be carried out during the assembly of the clutch on the vehicle, and this makes this operation both delicate and difficult to check.

The present invention has for its object improvements in electro-magnetic clutches of the kind described, which removes these drawbacks and simplifies the erection, whilst its construction is simple and gives no trouble during working.

In accordance with one of the features of these improvements, the yoke, the armature, the plates and the disc form a separate assembly which can be individually regulated and which is intended to be mounted on an auxiliary plate rigidly fixed to the crankshaft, by a fixing arrangement which is accessible both before and after the clutch has been mounted in position.

The working faces of the yoke and of the plate which is rigidly fixed to it are directed towards the driving shaft, the unit assembly formed by the said yoke and the said plate being fixed at its periphery to the auxiliary plate, access to members located on the driving shaft side not being necessary for the purposes of this fixing operation.

Other particular features and advantages of the invention will furthermore be brought out in the description which follows below, the form of construction herein being chosen by way of example, reference being had to the attached drawing, in which:

The single figure is a view in longitudinal cross-section of a clutch in accordance with the invention.

In the form of construction shown, there can be seen at 10 the driving shaft and at 11 the driven shaft of the electro-magnetic clutch. In one application of the clutch to automobile vehicles, the shaft 10 for example constitutes the crankshaft of the engine, whilst the shaft 11 forms the primary shaft of the gear-box.

An auxiliary plate 12, perpendicular to the shafts 10 and 11, is of large diameter and is fixed by a bolt and nut 13 to a flange on the shaft 10.

The clutch comprises a yoke 16 with a coil 17, an armature 18 associated with the yoke and mounted thereon so as to be fast for rotation and free for lateral movement to the yoke 16, a plate 20 fixed to the armature 19, a friction disc 21 intended to be gripped between the plates 19 and 20 and mounted so as to be fixed for rotation on the driven shaft 11.

The collector rings 31 for bringing in the electric current supply to one extremity of the coil 17 and/or for the connection to ground of the other end of the coil, have a fixed axial position. The yoke 16 is located on the side opposite to the shaft 10 and carries the rings 31 directly, the electric connection 32 between the rings 31 and the coil 17 being thus short, direct and without axial movement. The magnetic leakages are negligible by reason of the distance of the yoke with respect to the members securing the clutch to the engine. The working face of the yoke which co-operates with the armature 18 is directed towards the shaft 10. The armature 18, the plate 19, the disc 21 and the plate 20 are arranged between the yoke 16 and the auxiliary plate 12. There will be seen at 33 the fixing means for securing the plate 20 to the armature.

The separately-adjustable individual unit assembly formed by the yoke 16, the armature 18, the plate 19, the disc 21 and the plate 20 is fixed to the periphery of the auxiliary plate 12 by means of screws 22 which are accessible both before and after the assembly of the clutch in position.

It will be noted that the plate 19 is fixed to the yoke 16 by any suitable means such as a hard centering member, as shown. The plate 19 is provided at the points where it is traversed by the screws 22 with separate projecting lugs 34. These lugs extend outwards on each side of the plate 19 and form cross members which ensure an effective and balanced fixation of the plate 19, the central open position of which facilitates the evacuation of heat.

What we claim is:

1. An electro-magnetic clutch comprising: a driving shaft and a driven shaft, an electro-magnet yoke fixed to the said driving shaft and having its working face directed towards said driving shaft, a friction plate fixed to the said yoke with its working face directed towards said driving shaft, an electro-magnet armature fast for rotation but free for lateral movement with respect to said yoke, a second friction plate fixed to the said armature, the said friction plates being located on the side of said yoke which is the nearer to the said driving shaft, a friction disc adapted to be gripped between the two said friction plates and mounted fast for rotation with said driven shaft, an auxiliary plate fixed to said driving shaft, means for fixing the unit assembly constituted by said yoke and said first-mentioned friction plate to the said auxiliary plate, said fixing means being accessible both before and after the mounting of the clutch in position and surrounding the said armature and said second friction plate.

2. A clutch as claimed in claim 1, and further comprising at least one collector ring for leading-in the supply current for said electro-magnet coil, the said collector rings being mounted on the said yoke in the fixed axial position.

3. A clutch as claimed in claim 1, in which the friction plate fixed to the said yoke is provided at its periphery with fixing lugs extending on each side of the said plate and adapted to serve as cross-stays between the said auxiliary plate and the said yoke, the said means for fixing the clutch to the auxiliary plate being passed through the said lugs.

4. A clutch as claimed in claim 3, in which the projecting portions formed by the said lugs on each side of the friction plate fixed to the yoke are substantially equal, whereby a balanced mounting is obtained for the said plate and effective ventilation passages are provided.

References Cited in the file of this patent

UNITED STATES PATENTS

| | | |
|---|---|---|
| 2,447,007 | Gravina et al. | Aug. 17, 1948 |
| 2,606,638 | Russell | Aug. 12, 1952 |
| 2,738,044 | Winther | Mar. 13, 1956 |
| 2,774,452 | Wisman | Dec. 18, 1956 |
| 2,822,906 | Wisman | Feb. 11, 1958 |

FOREIGN PATENTS

| | | |
|---|---|---|
| 594,906 | Great Britain | Nov. 21, 1947 |
| 633,632 | Great Britain | Dec. 19, 1949 |
| 645,728 | Great Britain | Nov. 8, 1950 |